May 26, 1959     H. F. RALEY     2,887,785
CONTROL SYSTEM FOR CLOTHES DRYERS
Filed June 3, 1958     3 Sheets-Sheet 1

INVENTOR.
HOWARD F. RALEY
BY
HIS ATTORNEY

May 26, 1959  H. F. RALEY  2,887,785
CONTROL SYSTEM FOR CLOTHES DRYERS
Filed June 3, 1958  3 Sheets-Sheet 2

INVENTOR.
HOWARD F. RALEY
BY
HIS ATTORNEY

INVENTOR.
HOWARD F. RALEY
BY
HIS ATTORNEY

United States Patent Office 2,887,785
Patented May 26, 1959

2,887,785

CONTROL SYSTEM FOR CLOTHES DRYERS

Howard F. Raley, Louisville, Ky., assignor to General Electric Company, a corporation of New York Application June 3, 1958, Serial No. 739,497

2 Claims. (Cl. 34—45)

My invention relates to clothes drying machines, and more particularly to an improved control system for use in such machines for controlling the various drying operations.

In one type of automatic control system presently in use in domestic clothes drying machines, the drying operation is controlled by the combined functioning of a control thermostat and a timer motor. The control thermostat operates a pair of switches which control respectively the timer motor and the main heater of the dryer during the drying operation. The two switches are operated inversely by the thermostat, so that the timer motor is not in operation while the heater is energized, and, conversely, the heater is de-energized when the timer motor is in operation. The trip point or upper operating temperature of the thermostat is so chosen that the heater is de-energized only when the clothes in the machine have dried to a considerable extent. The timer motor thus remains inoperative for the greater portion of the drying cycle. When the timer motor is energized, however, it turns toward an off position and when it reaches that position it terminates the dryer operation.

In cooperation with such a system there may be provided a second or auxiliary thermostat which modifies the operating temperatures of the control thermostat to increase them as the temperature sensed by the auxiliary thermostat increases. Such an arrangement is fully described and claimed in the specification and claims of application Serial No. 650,789, filed on April 4, 1957 by Philip G. Hughes and assigned to the General Electric Company, owner of the present invention. In brief, the auxiliary heater operates at the same time as the timer so that it is first energized when the control thermostat shuts off the heater, and ceases to be energized when the control thermostat re-energizes the heater. The point of this arrangement is to increase the temperature within the dryer for heating operations subsequent to the first one. Since the auxiliary heater operates each time that the main heater is shut off, the more cycles required of the main heater before the timer motor runs to the end of its course, the higher the temperature in the dryer will have risen. This increase in the temperature, provided in connection with medium and heavy types of fabrics, shortens the length of time required for the drying operation appreciably, causing a more rapid rate of moisture removal from the clothes. No damage to the clothes can occur as a result of this increased temperature since by the very structure of the fabrics they are able to withstand higher temperatures than the more delicate synthetic fabrics; the dryer will normally be shut off after a single thermostat operation where synthetic fabrics are involved, and therefore the dryer temperature is not affected in any way by operation of the auxiliary thermostat and the auxiliary heater.

It is also required of most modern domestic clothes drying machines that in addition to an ordinary drying cycle, they be able to provide a "de-wrinkle" drying cycle. The de-wrinkle cycle is in essence a completely timed cycle, that is, one where the timer runs from beginning to end of the operation without regard to the position of the control thermostat and where the temperature within the dryer is a crucial factor; the purpose of this type of cycle is to dry synthetic fabrics by using a temperature high enough to cause a certain amount of plasticity to appear in the synthetic fabric without however going high enough in temperature to destroy or damage the fabric. Proper use of this type of cycle permits clothing made from certain synthetics to be completely free from wrinkles when removed from the dryer.

However, when the auxiliary thermostat and auxiliary heater have been provided, as described above, it has been necessary to provide yet a third thermostat which is positioned to be operative during the de-wrinkle cycle so as to limit the effect that the auxiliary thermostat can have on the control thermostat. This has, of course, noticeably added to the expense of manufacture of such dryers. However, where the usual three-wire 230 volt system has been used as a power source, it has been discovered that the temperature in the dryer will rise only to the desired de-wrinkle temperature if instead of always operating the auxiliary heater across the power supply lines (about 230 volts) it is operated across one supply line and the neutral wire for the de-wrinkle cycle while leaving it across the two supply lines for the automatic cycle. By providing this connection it has been found possible to obtain full advantage of the auxiliary thermostat and auxiliary heater means in the automatic cycle while at the same time obtaining the desired temperature for the timed de-wrinkle cycle without the necessity for the additional de-wrinkle thermostat previously found necessary.

It is accordingly a primary object of the invention to provide in a dryer an improved control system permitting use of either the automatic drying cycle described above or the de-wrinkle cycle described above, wherein the auxiliary heater described in the aforementioned Hughes application is so connected as to provide the desired de-wrinkle temperature without necessitating an additional de-wrinkle thermostat.

It is a more specific object of the invention to achieve this goal by operating the auxiliary heater continuously across 115 volts during the de-wrinkle cycle while operating it only alternatively with the main heater but across the full 230 volts during the automatic cycle.

In carrying out my invention in one form thereof, I provide a clothes dryer which is, in the usual manner, adapted for operation on a three-wire power supply including two supply conductors connected to a power source and one neutral wire connected to ground. The power source usually provides a potential of 115 volts alternating current between the source and ground, so that devices connected between the two supply conductors are placed across a potential 230 volts while devices connected between one supply conductor and the neutral wire are connected across 115 volts. The dryer includes an electric heater adapted to be connected across the supply conductors so that the current will cause the heater to supply heat to dry the clothes. A control thermostat responsive to the temperature within the dryer is provided, and is movable from a normal position to a tripped position as the temperature rises. First switch means are arranged in series with the heater, the switch means being opened in response to movement of the control thermostat to the tripped position and being closed in response to movement of the control thermostat to the normal position. Auxiliary thermostatic means are arranged to increase and decrease the trip temperature of the control thermostat in response to increases and decreases in the temperature sensed by the auxiliary thermostatic means. To provide for an increase in the temperature sensed by the auxiliary thermostatic means, auxiliary electric heating means are provided to heat the auxiliary thermostatic means.

A timer motor operates suitable control means, and manually operable means are provided for moving the control means to either one of two operative positions. The timer motor operates, as usual, to move the control means from either of the operative positions in which they can be positioned toward an inoperative position which terminates all operations of the dryer. I also provide second switch means which are operable from a first to a second position in response to movement of the control thermostat to its tripped position, and from the second position back to the first position in response to movement of the control thermostat to its normal position.

In its first operative position, the control means completes a circuit to energize the timer motor and to energize the auxiliary heating means across both supply conductors in response to movement of the second switch means to its second position; the timer motor and the auxiliary heating means are de-energized in response to the movement of the second switch means to its first position. However, when the control means is in its second operative position, it completes a circuit to energize the timer motor and to energize the auxiliary heating means across one supply conductor and the neutral wire independently of the second switch means and continuously until the control means terminates all the dryer operations.

The above arrangement thus causes continual heating of the auxiliary heating means across 115 volts during the de-wrinkle cycle, where the operation is timed from beginning to end, and provides for 230 volts energization of the auxiliary heating means alternatively with energization of the main heater during the automatic cycle. It has been found that this gives the desired result of increasing the temperature and decreasing the time required for drying medium and heavy fabrics during the automatic cycle, while at the same time providing the desired de-wrinkle temperature during the de-wrinkle cycle without necessitating an additional thermostat especially for that purpose.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings in which:

Figure 1:
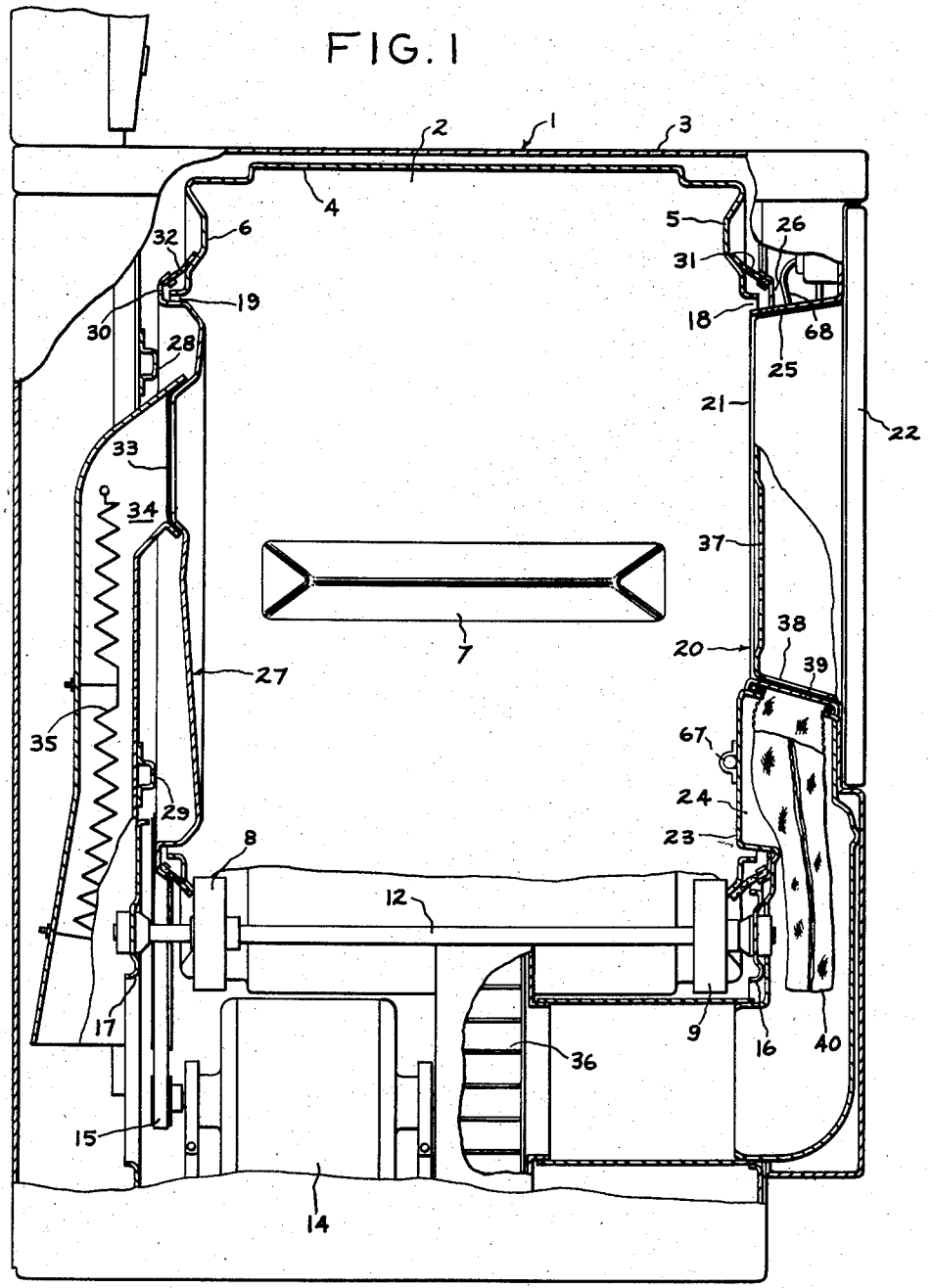
Fig. 1 is a side elevational view of a clothes dryer which is exemplary of the various clothes dryers which may be controlled by my improved control system, the view being partially broken away and partially sectionalized to illustrate details of the dryer.
Figure 2:
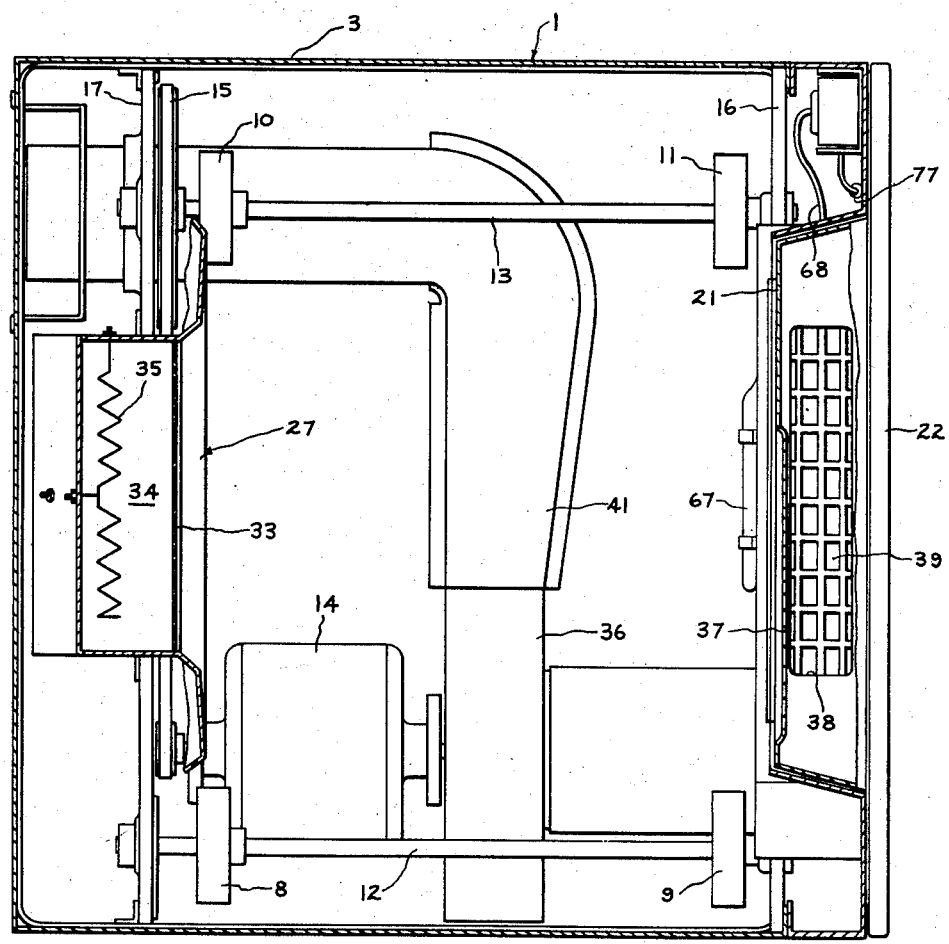
Fig. 2 is a horizontal sectional view of a dryer, with the basket removed and with certain surfaces broken away and partially sectionalized to illustrate further detail.

Referring now to Figs. 1 and 2 I show therein a domestic clothes dryer 1 which includes a rotatable open-ended clothes tumbling basket 2. Basket 2 is mounted for rotation about a horizontal axis and is disposed within a suitable outer casing 3 which encloses it on all sides. The basket specifically comprises a cylindrical drum-like member having an outer cylindrical wall 4 and front and rear end walls 5 and 6. The outer cylindrical wall 4 is imperforate over its entire length and on its interior surface is provided with a plurality of clothes tumbling ribs such as the one shown at 7 in Fig. 1.

The clothes basket is rotatably supported within the casing 3 by means of a plurality of rollers 8, 9, 10 and 11 (see Fig. 2). Rollers 8 and 9 are mounted on a rotatable idler shaft 12 and rollers 10 and 11 are mounted on a powered shaft 13 which is driven from the main drive motor 14 of the machine by means of the belt and pulley connection 15. As shown, both the drive shaft 13 and the idler shaft 12 are supported adjacent the front and rear of the dryer by means of suitable bearings mounted in front and rear support plates 16 and 17. Being freely supported on the roller wheels, basket 2 turns thereon whenever drive shaft 13 is turned by the motor 14. The ratio of the drive and driven pulleys in drive 15 is suitably chosen so that the basket is rotated at an appropriate speed to provide a clothes tumbling action for the articles of clothing placed therein.

In order that a stream of heated air may be passed through the basket 2 to dry the clothes being tumbled therein, the basket is provided with suitable apertures in its front and rear walls. Specifically, its front end wall 6 is provided with a central aperture 18 and the rear end wall is provided with a similar aperture 19. Front opening 18 is covered or closed by means of a combination bulkhead, indicated generally at 20, which is formed of the inner surface 21 of an access door 22 provided for the machine, a wall 23 of an outlet duct 24 leading from the basket, a door seat 25 for the door 22, and an annular flange 26 mounted on the door seat and the wall of the duct 24. It will be noted that the annular flange 26 comprises the periphery of the combination bulkhead 20, surrounding the opening 18 in the basket. The access door 22 when open provides for the insertion and removal of clothes from basket 2.

The rear opening 19 of the basket is likewise closed by means of a stationary bulkhead which in this case is formed as a one-piece bulkhead 27 supported from the dryer casing by a pair of cross supports 28 and 29. The outer edge of bulkhead 27 is provided with a flange 30 which surrounds opening 19 in a manner similar to the relationship of flange 26 and opening 18.

Suitable air seals are provided at both the front and the rear of the basket to prevent air leakage. A sealing member 31 mounted on stationary flange 26 of the front bulkhead slidably engages the basket front wall 5 to prevent air leakage into the basket through opening 18; a similar sealing member 32 mounted on flange 30 of the rear bulkhead engages rear wall 6 to prevent leakage into the basket through opening 19. Sealing members 31 and 32, in addition to acting as air seals, may also act as thrust bearings for basket 4, holding the basket in its axial position on rollers 8, 9, 10 and 11 by their resilience.

In order to dry the clothes being tumbled within the basket, a stream of heated air is introduced into it through the rear bulkhead 27, is passed axially across the basket and is then exhausted to the front bulkhead 20. Rear bulkhead 27 is provided with a screened air inlet opening 33; mounted behind bulkhead 27 and leading to inlet 33 is an air intake duct 34 which has positioned in it an electric heater generally indicated at 35. The intake duct 34 is open at its lower end and the air passes upwardly through it to the opening 33 during the operation of the machine. As the air passes through the duct it is heated by heater 35 and thus when it flows into the drum through opening 33 it is at a suitable temperature for drying the clothes. The air passing into the duct enters the cabinet through any suitable air inlet openings (not shown) connecting the interior of the cabinet to atmosphere.

The suction for drawing the air into the basket through the intake duct 34 and opening 33 is created by means of a centrifugal blower 36 which is driven directly by drive motor 14. The intake of blower 36 is connected to the front end of the basket by means of the duct 24 and the door 22. Door 22 is formed with an opening 37 in inner surface 21 thereof, and is also provided with a second opening 38 which communicates with the upper end of duct 29 through an aligned opening 39 in door seat 25. From the opening 39 of the door seat duct 24 leads directly to the intake of the blower. With this duct arrangement, the blower applies a suction at the opening 38 which draws air into the basket through the intake duct 34 and inlet 33. The air so entering the basket is drawn axially across the basket to the opening 38 and then passes downwardly through the opening 39 and duct 24 into the blower. As the air enters the exhaust duct through the openings 38 and 39, it passes through a fine mesh lint trap 40 which is supported by the door seat and which is effective to remove any lint carried by the air. From the blower, the air is exhausted from the machine through an outlet duct 41 which extends rearwardly to the back wall of the machine. The back wall is provided with a suitable aperture (not shown) to allow for the escape of the air from the machine.

Figure 3:
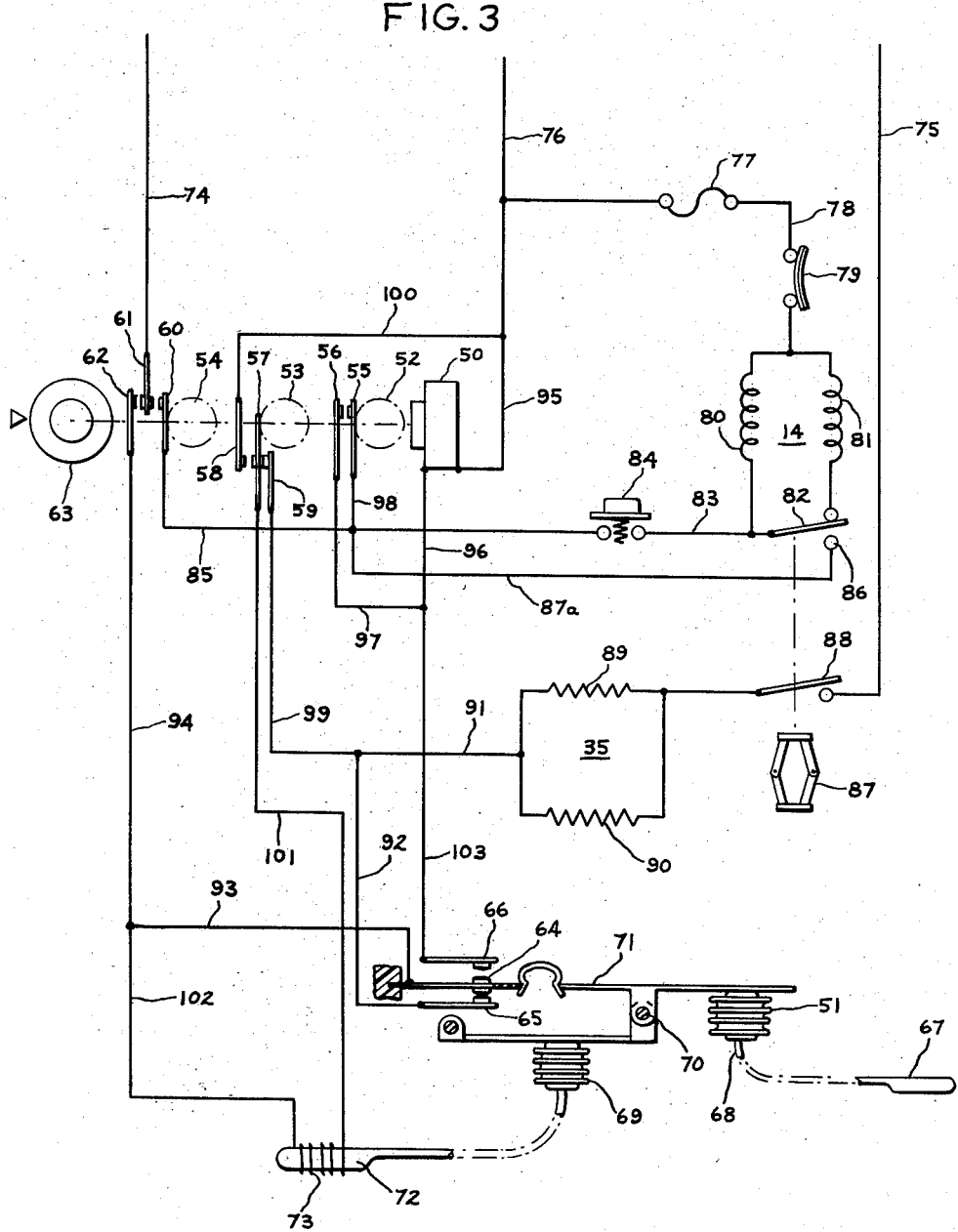
Fig. 3 is a schematic circuit diagram of a preferred embodiment of my improved control system.

Dryer 1, as thus far described, represents a domestic clothes drying device of the type intended to be controlled by my new and improved control system as illustrated in schematic form in the circuit diagram of Fig. 3. My control system includes a timer motor 50, preferably of the synchronous type, and a control thermostat 51. The timer motor is arranged to cause rotation of three control members or cams 52, 53 and 54. Cam 52 controls the opening and closing of two contacts 55 and 56; cam 53 controls the alternative engagement of a contact 57 with either one of two contacts 58 and 59; cam 54 controls the engagement of three contacts 60, 61, and 62 so that either all three are together or else only contacts 60 and 61 are in engagement. In addition to being operated by timer motor 50, the position of cams 52, 53 and 54 may be preset by manual means 63 to determine what type of drying operation is to be provided.

The control thermostat 51 operates a movable contact 64 which in its lower position engages a contact 65 and in its upper position engages a contact 66. Contacts 64 and 65 thus represent switch means which are closable when the thermostat 51 expands to a predetermined extent while contacts 64 and 66 represents switch means which are closable when the thermostat 51 shrinks to a predetermined extent in response to a drop in the temperature sensed by bulb 67 which is connected to the thermostat by means of any suitable line or tube 68. As shown in Figs. 1 and 2, the sensing element or bulb 67 is preferably positioned at the front of the dryer on the bulkhead 20 directly below the air outlet opening 37 from the drum. Thus, bulb 67 is effective to sense the temperature of the exhaust air leaving the drum, which temperature is very close to the actual clothes temperature.

It will be noted that in accordance with the invention set forth in the aforementioned Hughes application, the relationship between control thermostat 51 and the contact 64 may be varied during operation of the dryer by a second thermostat 69 which moves the pivot point 70 of link 71 so that a higher or lower temperature is required within the dryer at bulb 67 for control thermostat 51 to operate the contact from one position to the other. The thermostat 69 is operated in response to the temperature sensed by a sensing member 72 which has positioned in intimate thermal relationship therewith an auxiliary heater 73. Upon energization of heater 73 thermostat 69 adjusts the position of link 71 to require a higher temperature within the dryer for the control thermostat 51 to open contacts 64 and 65 and close contacts 64 and 66.

The relationship of the timer 50 and the cams and switch means controlled thereby, and of the control thermostat 51 and auxiliary thermostatic means 69, to effect suitable control of the auxiliary heater 73 for both an automatic drying cycle and a de-wrinkle drying cycle will be best understood by the following description of the basic operation of the system. The entire system is energized from a three-wire power supply having supply conductors 74 and 75 and a neutral wire 76. For domestic use, the conductors 74 and 75 will normally be across 230 volts, with 115 volts appearing between the neutral line 76 and each of the supply conductors 74 and 75.

The drive motor 14 of the machine is energized between the neutral line 76 and the supply conductor 74. Commencing with the neutral line 76, the drive motor circuit extends to the drive motor through a fusible cutout 77, conductor 78, and a thermally responsive motor overload protector 79. The motor includes a main winding 80 and a starting winding 81 which are connected in parallel through a motor operated centrifugal switch 82 when the machine is at standstill. From switch 82 the circuit extends through a conductor 83 to a normally open start switch 84, and from switch 84 the circuit is completed to the supply conductor 74 through a conductor 85 and the timer controlled contacts 60 and 61. Assuming these contacts to be closed, the motor is, then, placed in operation by closing switch 84. This places line voltage on both main winding 80 and start winding 81 of the motor which commences to rotate. As the motor comes up to speed, centrifugal switch 82 is operated from its illustrated position wherein it connects the windings in parallel to a second position wherein it opens start winding 81 and connects the main winding to a contact 86. As shown, the switch 75 is operated by means of any suitable centrifugal mechanism 87 driven directly by motor 14. Contact 86 is connected directly to the conductor 85 through a line 87a so that the effect of the operation of the switch 82 is to drop the start winding out of the circuit without deenergizing the main winding. The motor then continues in operation on the main winding alone, with that winding being locked in by the switch 82 for as long as the motor rotation continues. The operator may thus release switch 84 and the motor will continue running until such time as the timer motor 50 opens the contacts 60 and 61.

When the drive motor 14 comes up to speed, heater 35 is then energized by the closing of switch 88 controlled by centrifugal mechanism 87. Starting with the supply conductor 75, the circuit extends through switch 88 to the heater, which may as shown be formed with two parallel resistors 89 and 90, through conductors 91 and 92, to the contacts 65 and 64 controlled by thermostat 51 which are normally closed at the start of the drying operation. In other words, when the exhaust air from the dryer is cold thermostat 51 operates pivoted arm 71 so as to close contacts 64 and 65. From contact 64 the heater circuit is completed through conductors 93 and 94 and timer controlled contacts 62 and 61 back to supply conductor 74.

Depending upon whether manual control 63 is used to select an automatic cycle or a de-wrinkle cycle, contact 57 will be caused by cam 53 to move into engagement either with contact 59 or contact 58 respectively. When contacts 57 and 59 are engaged, cam 52 is in a position where contacts 55 and 56 are separated; when cam 53 causes contacts 57 and 58 to engage, contacts 55 and 56 are also closed.

When contact 57 engages contact 59, and contacts 55 and 56 are in engagement, the timer motor 50 is continuously energized through a circuit which, starting with the neutral line 76, extends through conductor 95 to the timer motor, then through conductors 96 and 97, contacts 56 and 55, conductors 98 and 85, and through contacts 60 and 61 to supply conductor 74. At the same time, the auxiliary heating means 73 is continuously energized across 115 volts through a circuit which, starting with neutral line 76, extends through conductor 100, contacts 58 and 57, conductor 101, the auxiliary heating means 73, conductors 102 and 94, and contacts 62 and 61 to the supply conductor 74.

However, when contact 57 engages contact 59, and contacts 55 and 56 have separated, the timer motor can no longer run continuously since the circuit therefor is open between the contacts 55 and 56. The circuit for the timer motor must therefore be completed, starting at neutral wire 76, through conductor 95, the timer motor itself, conductors 96 and 103, contacts 66 and 64 of the thermostatically controlled arrangement, conductors 93 and 94, and contacts 62 and 61 to supply conductor 74. The timer motor is thus dependent upon the position of thermostatically controlled contact 64 for its operation. The auxiliary heating means 73 are operated across 230 volts on a circuit which, starting at supply conductor 75, passes through switch 88, heater 35, conductors 91 and 99, contacts 59 and 57, conductor 101, the auxiliary heating means, conductors 102 and 94, contacts 62 and 61 and supply conductor 74. This circuit is effective to cause heating of the auxiliary heating means only when the contact 64 does not complete a parallel circuit for heater 35 through conductors 92 and 93, since the closing of such a parallel circuit will cause almost all the current to bypass the auxiliary heating means and it will not heat. Thus, for one manual setting the timer is operated continuously across one supply conductor and the neutral and the auxiliary heating means are operated continuously across one supply conductor and the neutral. For the other manual setting the timer motor and the auxiliary heating means are operated only alternatively with the heater 35, with the auxiliary heating means being energized across 230 volts when the circuit to it is completed.

A fuller understanding of the operation can be obtained from the following description. First, let it be assumed that manual control 63 is moved to the position which indicates to the operator that an automatic operation has been selected. With this arrangement, contacts 55 and 56 are open; contact 57 engages contact 59; and contacts 60, 61 and 62 are closed. With the thermostat 51 in its cold position, that is, as shown in Fig. 3, a circuit for the motor 14 is thus completed as previously described, because of the closing of contacts 60 and 61. This then closes switch 88 and a circuit for the heater is completed through contacts 64 and 65 of the thermostatically controlled arrangement, no heat having yet been supplied to the thermostat 51. The heater 35 then supplies heat until bulb 67 senses a predetermined high level at which point the link 71 causes contact 64 to move out of engagement with contact 65 and into engagement with contacts 66. This breaks the circuit to the heater 35 except for the circuit which is completed through contacts 57 and 59 and through the auxiliary heater. The auxiliary heater is thus energized to start heating of the bulb 72 to cause the thermostat 69 to increase the temperature at which control thermostat 51 is effective. Also, the closing of contacts 64 and 66 energizes the timer motor which starts to run. This continues until the thermostat 51 has cooled sufficiently to move contact 64 back into engagement with contact 65. This stops the heating of auxiliary heater 73, stops the timer motor 50, and starts the energization of heater 35 again. This action is repeated until such time as the timer motor has run long enough to bring the operation to a close by opening all the timer operated contacts. The automatic operation is thus terminated.

For the de-wrinkle operation, the manual control 63 is moved to a position where contact 57 engages contact 58, contacts 55 and 56 are closed, and contacts 60, 61 and 62 are also closed. The drive motor circuit is completed in the same manner as for the automatic dry cycle. This of course closes switch 88 and the circuit through the heater is completed as before through contacts 64 and 65 of the thermostat so that the thermostat controls the operation of the heater. However, the operation of the timer is completed through contacts 55 and 56 as described above, completely independently of the operation of the thermostat 51, and operation of the auxiliary heater is effected across 115 volts (that is, one supply conductor and the neutral wire) through contacts 57 and 58 completely independently of the control thermostat 51. The de-wrinkle operation is ended by the opening of contacts 55 and 56; 57 and 58; and 60, 61 and 62. If so desired, contacts 61 and 62 may be opened first to stop heater operation, without interfering with the timer motor or the drive motor, to provide a period of tumbling without heat. Then, after a few minutes, the other contacts open to terminate the entire de-wrinkle operation.

Thus, the operation of the auxiliary heating means is tailored to the needs of each of the two individual types of cycles. In the automatic cycle, the operation of the auxiliary heating means is intermittent, that is, it is alternative with operation of the main heater and when energized the energization is across 230 volts, i.e., the two supply conductors. When the cycle is a straight timed one with the timer motor operating continuously, the operation of the auxiliary heating means is also continuous but across 115 volts, that is, across only one supply conductor and the neutral wire. In this manner, the auxiliary heating means provides the desired decrease in time for the automatic cycle when medium and heavy fabrics are to be dried, and also provides the desired de-wrinkle temperature without necessitating an additional thermostat as was previously required where the energization of the auxiliary heating means was across the same voltage as for the automatic cycle.

While in accordance with the patent statutes I have described what at present is considered to be the preferred embodiment of my invention, it will be obvious to those skilled in the art that various changes and modifications may be made therein without departing from the invention, and it is, therefore, aimed in the appended claims to cover all such equivalent variations as fall within the true spirit and scope of the invention.

What I claim as new and desire to secure by Letters Patent of the United States is:

1. In a clothes dryer adapted for operation on a three-wire power supply including two supply conductors connected to a power source and one neutral wire connected to ground, an electric heater adapted to be connected across the supply conductors to dry the clothes, a control thermostat responsive to the temperature within the dryer and movable from a normal position to a tripped position as the temperature rises, first switch means in series with said heater, said switch means being opened in response to movement of said control thermostat to said tripped position and being closed in response to movement of said control thermostat to said normal position, auxiliary thermostatic means arranged to increase and decrease the trip temperature of said control thermostat in response to increases and decreases in the temperature sensed by said auxiliary thermostatic means, auxiliary electric heating means positioned to heat said auxiliary thermostatic means, a timer motor, means controlling operation of said dryer operated by said timer motor, manually operable means for moving said control means to either one of two operative positions, said timer motor operating to move said control means from either operative position toward an inoperative position terminating all operations of said dryer, second switch means operable from a first to a second position in response to movement of said control thermostat to said tripped position and from its second position to its first position in response to movement of said control thermostat to said normal position, said control means in its first operative position completing circuits in response to movement of said second switch means to its second position to energize said timer motor and to energize said auxiliary heating means across the supply conductors, said timer motor and said auxiliary heating means being de-energized in response to movement of said second switch means to its first position, said control means in its second operative position completing circuits independently of said second switch means to energize said timer motor and to energize said auxiliary heating means across one supply conductor and the neutral wire.

2. In a clothes dryer adapted for operation on a three-wire power supply including two supply conductors connected to a power source and one neutral wire connected to ground, an electric heater adapted to be connected across the supply conductors to dry the clothes, a control thermostat responsive to the temperature within the dryer and movable from a normal position to a tripped position as the temperature rises, first switch means controlled by said control thermostat to be closed when said control thermostat is in said normal position and to be opened when said control thermostat is in said tripped position, said first switch means being positioned in series with said heater, auxiliary thermostatic means arranged to increase and decrease the trip temperatures of said control thermostat in response to increases and decreases in the temperature sensed by said auxiliary thermostatic means, auxiliary electric heating means positioned adjacent said auxiliary thermostatic means to heat the same, a timer motor, cams operated by said timer motor, switch means operated by said cams, manually operable means for moving said cams to either one of two operative positions, said timer motor operating to move said cams from either operative position toward an inoperative position where they open said cam operated switch means to terminate all operations of said dryer, second switch means controlled by said control thermostat to be open when said control thermostat is in said normal position and to be closed when said control thermostat is in said tripped position, said second thermostat operated switch means being positioned in series with said timer motor, said cam operated switch means in their first operative position completing circuits to energize said timer motor through said second thermostat operated switch means and to energize said auxiliary heater means across the supply conductors in response to opening of said first control thermostat operated switch means, said timer motor and said auxiliary heating means being deenergized in response to movement of said thermostat to close said first thermostat operated switch means and open said second thermostat operated switch means, said cam operated switch means in their second operative position completing circuits to energize said timer motor and to energize said auxiliary heating means across one supply conductor and the neutral wire independently of said second thermostat operated switch means.

References Cited in the file of this patent

UNITED STATES PATENTS

| | | |
|---|---|---|
| 2,590,808 | Wagner | Mar. 25, 1952 |
| 2,743,532 | Steward | May. 1, 1956 |
| 2,851,788 | Dunkelman | Sept. 16, 1958 |